Figure 1:
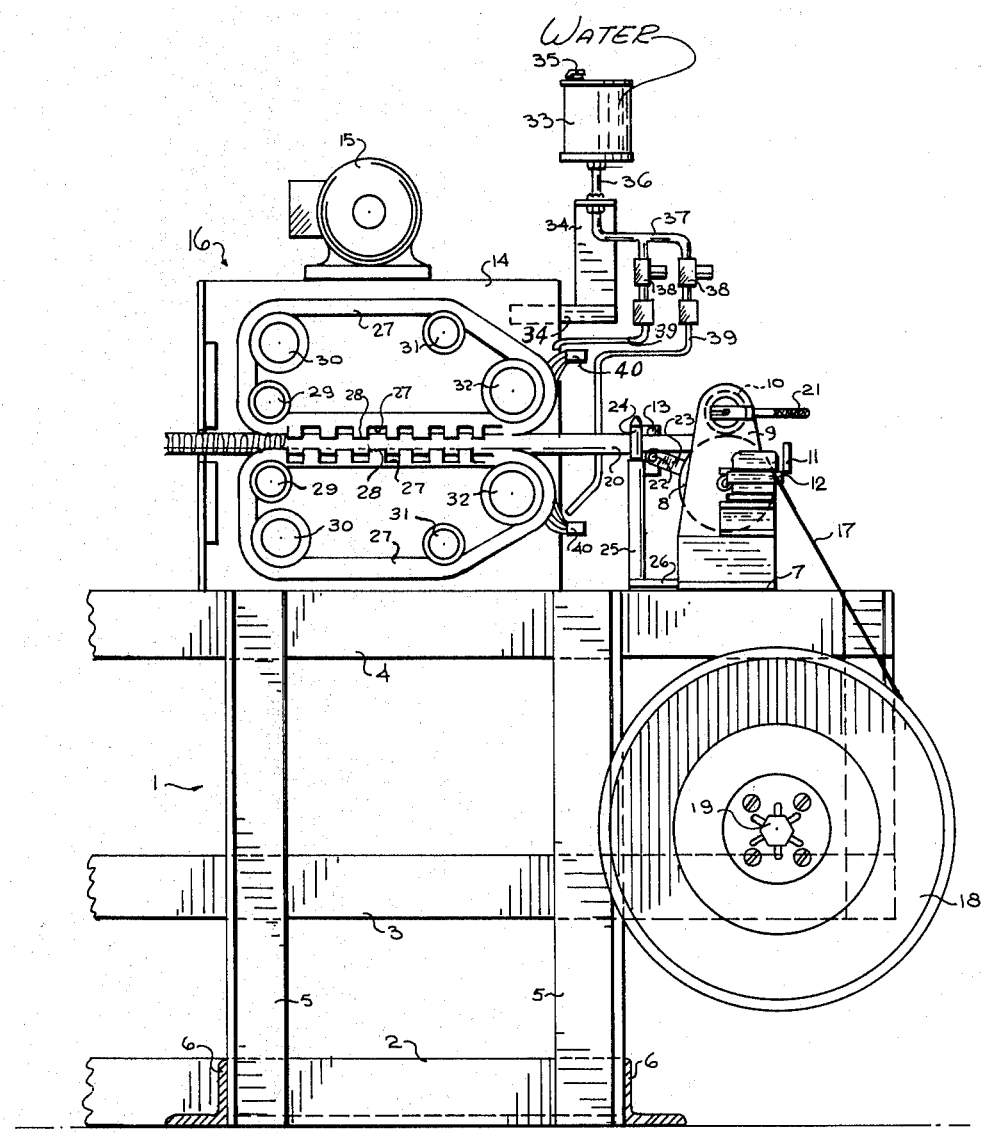

Dec. 7, 1965    L. C. ARNOLD ETAL    3,222,192
PROCESS OF SHIRRING SYNTHETIC SAUSAGE CASINGS
Filed June 14, 1963    5 Sheets-Sheet 1

INVENTORS
LIONEL C. ARNOLD.
HARRY G. WASHBURN.
BY
Neal J. Mosely
their Attorney

Dec. 7, 1965    L. C. ARNOLD ETAL    3,222,192
PROCESS OF SHIRRING SYNTHETIC SAUSAGE CASINGS
Filed June 14, 1963    5 Sheets-Sheet 4

INVENTOR.
LIONEL C. ARNOLD
HARRY G. WASHBURN
BY
Neal J Mozely
their Attorney

Dec. 7, 1965  L. C. ARNOLD ETAL  3,222,192
PROCESS OF SHIRRING SYNTHETIC SAUSAGE CASINGS
Filed June 14, 1963  5 Sheets-Sheet 5

INVENTOR.
LIONEL C. ARNOLD
HARRY G. WASHBURN
BY Neal J. Mozely
their Attorney

United States Patent Office 3,222,192
Patented Dec. 7, 1965

3,222,192
PROCESS OF SHIRRING SYNTHETIC
SAUSAGE CASINGS
Lionel C. Arnold and Harry G. Washburn, Danville,
Ill., assignors to Tee-Pak, Inc., Chicago, Ill., a corporation of Illinois
Filed June 14, 1963, Ser. No. 288,008
10 Claims. (Cl. 99—176)

This invention relates to new and useful improvements in the shirring of artificial sausage casings and more particularly to the simultaneous shirring and humidification of such casings.

Artificial sausage casings, particularly casings formed of regenerated cellulose, are prepared as hollow, thin walled tubes of very great length. For convenience in handling, these casings are shirred from lengths ranging from 40-160 ft. or more down to a shirred and compressed length of the order of a few inches. An early type shirring machine and the resulting shirred product are shown in Dietrich U.S. Patent 2,010,626. Improved forms of shirring machines and the products thereof are shown in Korsgaard U.S. Patent 2,583,654; Blizzard et al. U.S. Patents 2,722,-714, 2,722,715, and 2,723,201; Gimbel U.S. Patent 2,819,-488; and Matecki U.S. Patents 2,983,949 and 2,984,574.

In the preparation and use of artificial sausage casings, particularly casings formed from regenerated cellulose, the moisture content of the casings has been of extreme importance. When the casings are first formed, it has been necessary that they be dried to a relatively low water content, e.g. 8-10%. A lower water content in the casing generally results in damage to the casing during the shirring operation and sometimes makes shirring completely impossible. Similarly, a high water content has resulted in damage to the casing during shirring, usually resulting from the casing's sticking to the shirring mandrel.

After a casing is shirred, it is packaged and shipped to a meat packing house where an individual shirred strand is placed on a stuffing horn and a meat emulsion extruded to fill the casing to its fully extended length. The stuffing of the casing usually takes place within a few seconds with the result that the casing is extended from a shirred length of 8-27 in. to an extended length of 40-160 ft. or more in a matter of 3-12 sec. This rapid extension of the casing during stuffing requires the casing to be especially strong and resistant to tearing. If even minor holes develop in the casing, the casing may split or break during stuffing and waste a large quantity of meat. In the shirring of artificial sausage casings, the pleats which are formed are sometimes interlocked and are almost always nested in a concave manner to provide a tightly compressed strand of casing for shipment and handling. The tightly compressed and sometimes interlocked pleats require a higher moisture content to permit extension of the casing during the stuffing operation without tearing or breaking the casing. In general, an average moisture content of 15-20% has been required, preferably about 17-18%. If the shirred casing has a moisture content appreciably less than about 15%, there is a tendency toward excessive breakage during stuffing. Likewise, if the casing has a moisture content in excess of about 20%, the casing is too plastic and may tend to overstuff. It is, therefore, essential that shirred casing be humidified to a relatively narrow, critical moisture content which is very uniform throughout the length of the casing to permit stuffing without excessive breakage.

In the past, shirred artificial sausage casings have been packaged in cartons or containers which are apertured at opposite ends to permit the circulation of moist air through the shirred casing strands to produce the desired moisture content in the casings.

When shirring machines of the type shown in Dietrich U.S. Patent 2,010,626 were in use, the shirred casings which were produced were accordion pleated but did not have nested concave pleats which were tightly compacted to provide shirred strands which were self-supporting. As a result, the shirred casing strands had to be packaged in small individual packages which were easily removed from the strand at the packing house after insertion over a stuffing horn. These individual cartons were apertured on both ends, and the packaged casings were humidified by passing moist air through and over the casing strands. At a later date, a package was developed for shirred casings, as shown in Hewitt U.S. Patent 2,181,329, which had a plurality of apertures at opposite ends and which would contain a large number of shirred casings. The Hewitt package was designed to permit the packaging of a number of shirred casing strands while providing for circulation of moist air through and about the strands to bring the moisture content to the level required for satisfactory stuffing. An improvement on the shirred casing carton of Hewitt is described and claimed in Firth U.S. Patent 2,794,544. The Hewitt and Firth packages, however, are both subject to substantial objections in commercial use. These packages are expensive to make because of the spaced perforations required in the ends of the cartons and suffer from severe mechanical weakness in the perforated end walls which result in breakage of the end walls from time to time.

The development of improved shirring machines of the type shown in the Korsgaard, Blizzard et al., Gimbel, and Matecki patents made possible the shirring of greater lengths of casing than had been previously possible. The Blizzard et al. shirring machine produced a shirred casing having accordion pleats which were nested tightly in a concave manner with the result that the shirred and compressed casing could be held without external support. As the casing industry has tended to produce longer and longer shirred strands, e.g. today strands up to 160 ft. are shirred, the problem of humidifying casing to the critical moisture content required for satisfactory stuffing has become increasingly difficult. In longer lengths of shirred casing, there is a considerable resistance to flow of moist air through the casing with the result that the ends of the casing tend to be more moist and the center of the casing less moist. Also, the moist air humidification technique has not been entirely practical for the humidification of heavy gauge casings and fibrous casings used for packaging of larger sausages and chunks and pieces of meat.

Accordingly, it is one object of this invention to provide a new and improved method for humidifying or moistening artificial sausage casings.

Another object of this invention is to provide a new and improved method of humidifying or moistening artificial sausage casings during a shirring process.

Still another object of this invention is to provide a new and improved humidifying and shirring process which produces shirred strands of casing having a more uniform distribution of moisture and a substantially improved shirring pattern.

Still another object of this invention is to provide a shirred synthetic casing of new and improved configuration.

A feature of this invention is the provision of an improved method for shirring synthetic sausage casings in which water is applied to the casing material at a point in the shirring process after the casing has been removed from the storage reel and prior to discharge of the shirred product from the process.

Another feature of this invention is the provision of a new and improved combined shirring and humidification process in which the casing is passed through a shirring apparatus having shirring belts or wheels with spaced lugs or other mechanical means for contacting the casing and forming it into a shirred product, wherein water is applied to the shirring wheels or belts or to the metering or feed means for transporting the casing to the shirring apparatus.

Still another feature of this invention is the provision of an improved shirring and humidification method wherein a synthetic sausage casing is fed over a hollow mandrel in a shirring machine and a predetermined amount of water is introduced into the interior of the casing through the shirring mandrel.

Still another feature of this invention is the provision of shirred strands of synthetic sausage casings having major folds interspersed with minor folds, the major folds being balloon shaped in cross section and overlying the minor folds in a tightly compacted and nested configuration.

Other objects and features of this invention will become apparent from time to time throughout the specification and claims as hereinafter related.

Figure 2:
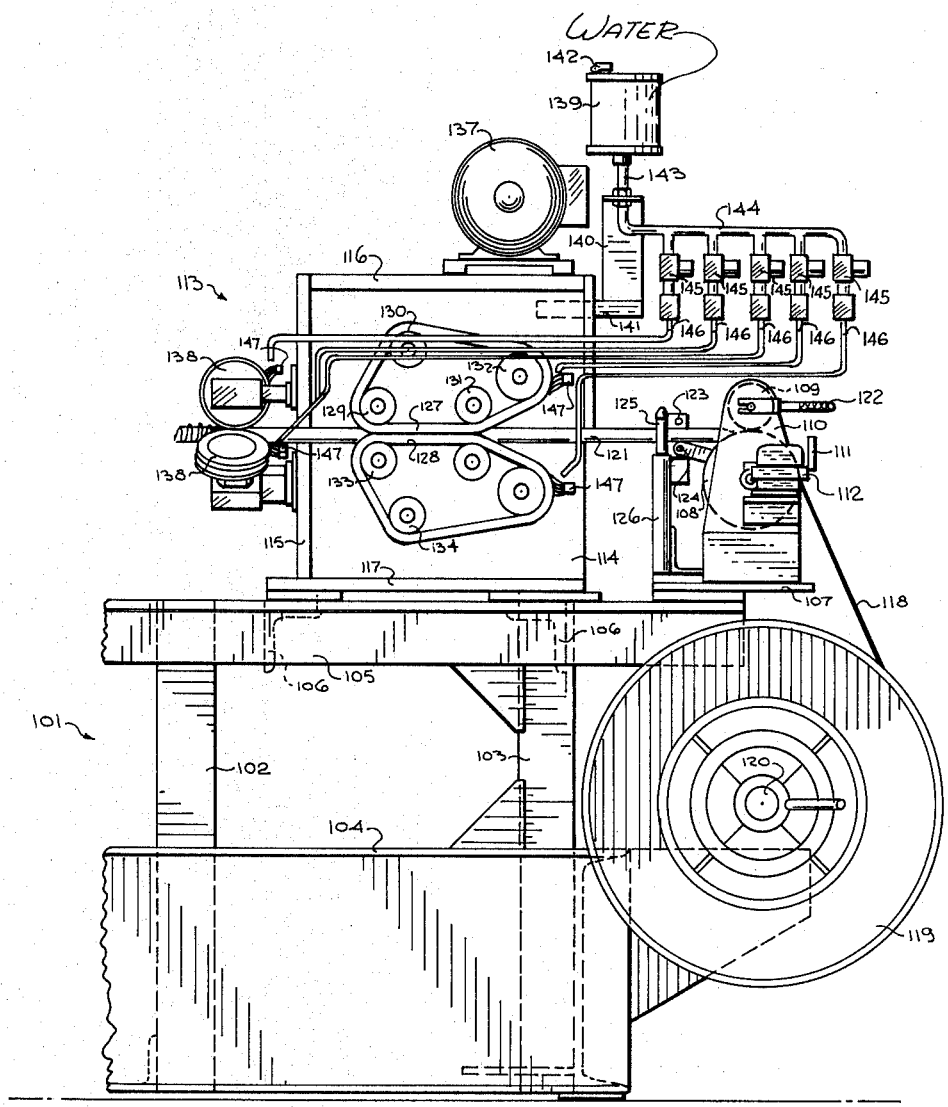
Figure 3:
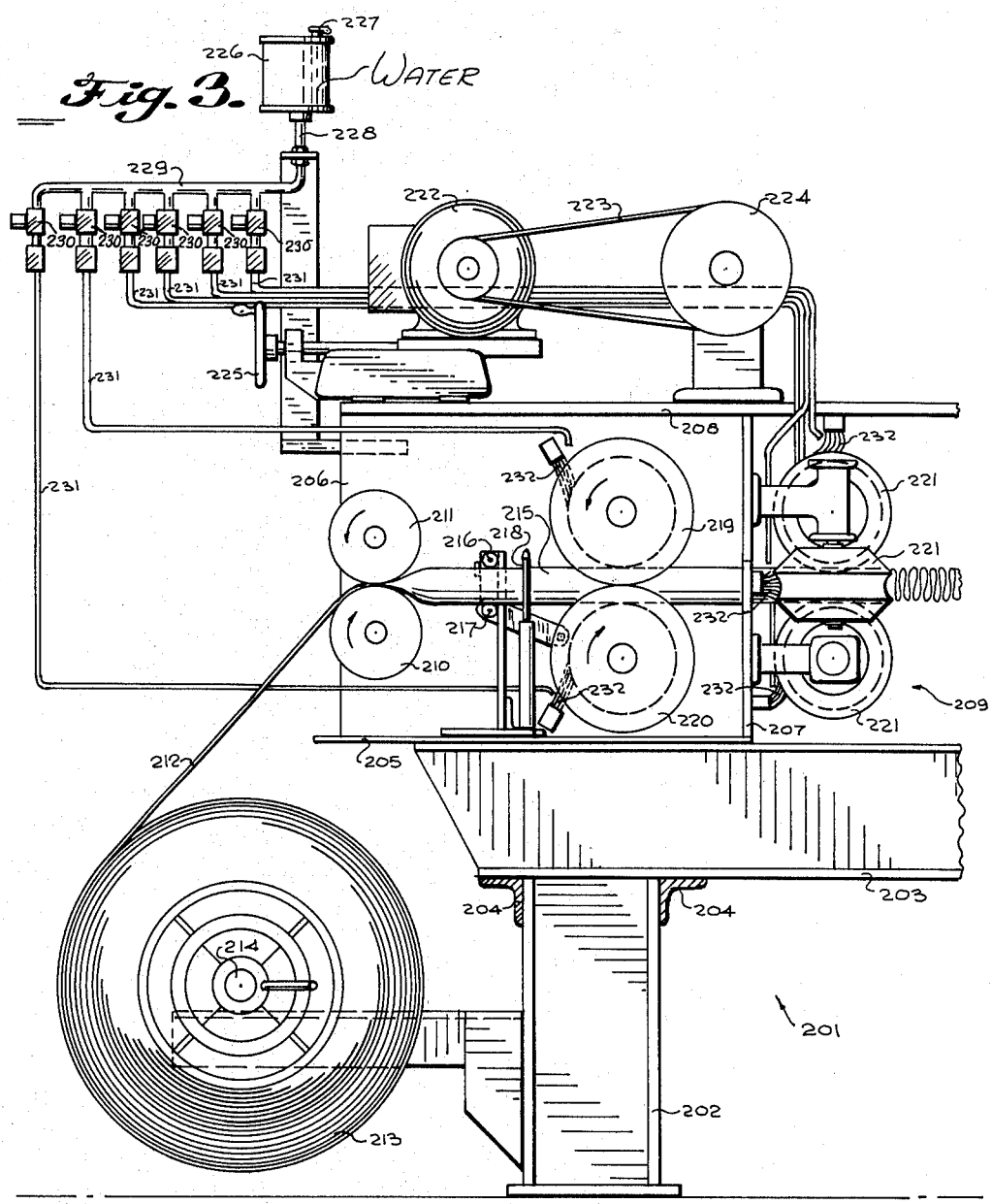
Figure 4:
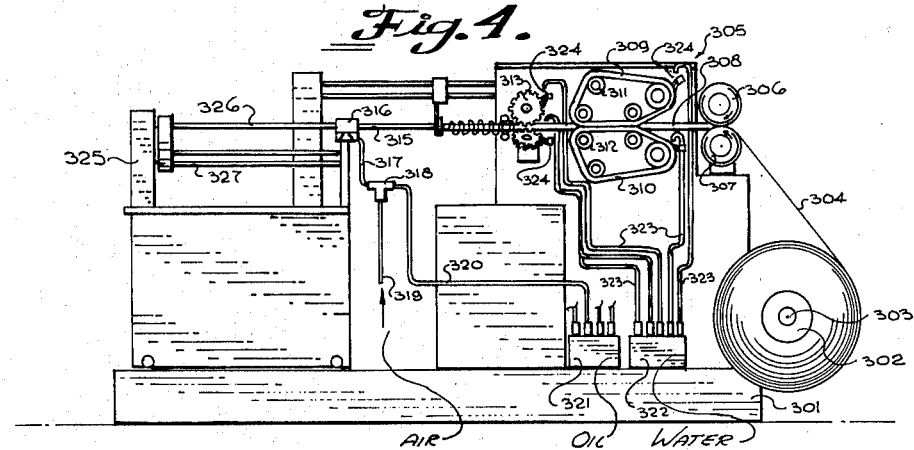
Figure 5:
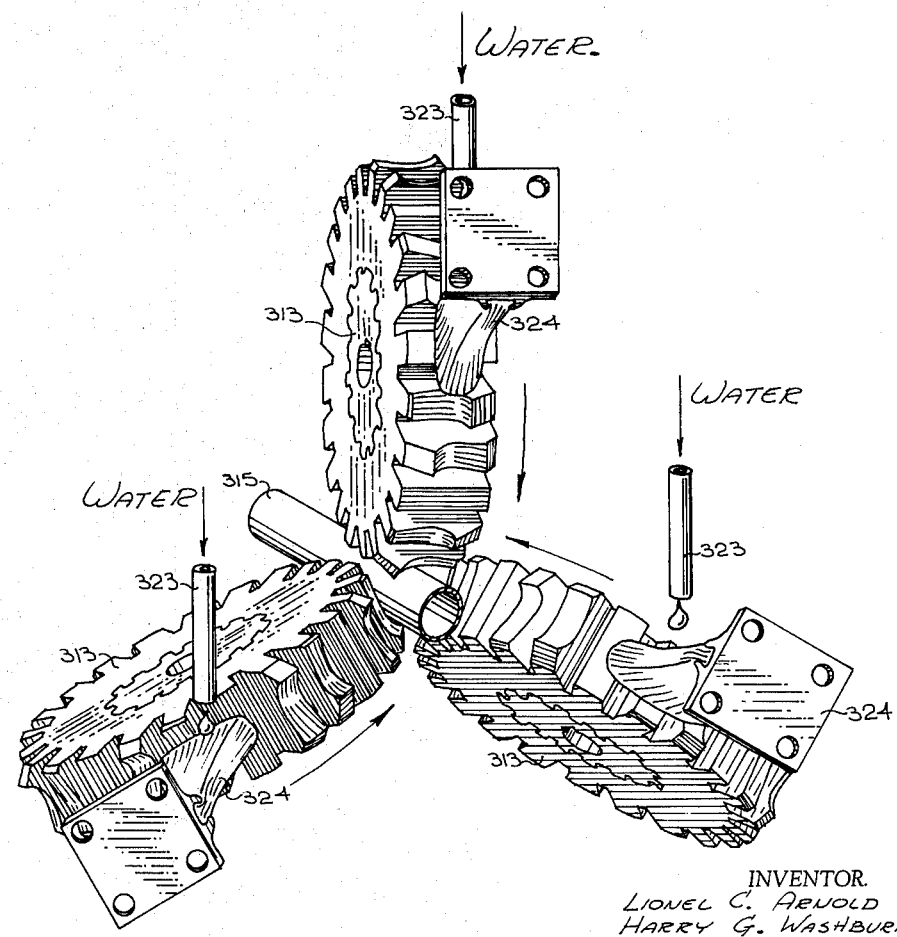
Figure 6:
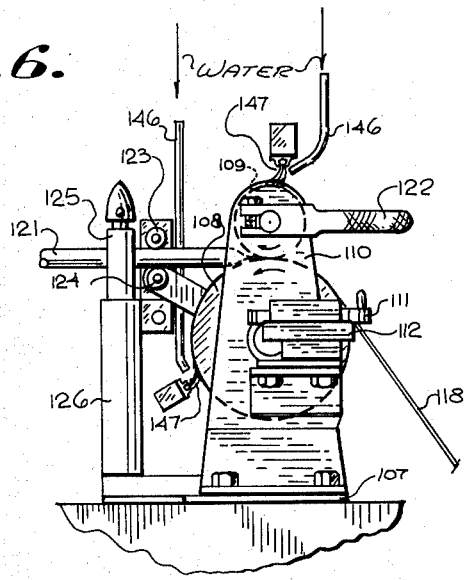
Figure 7:
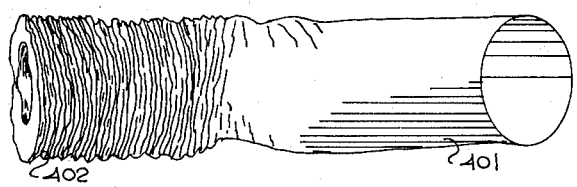
Figures 8, 9:
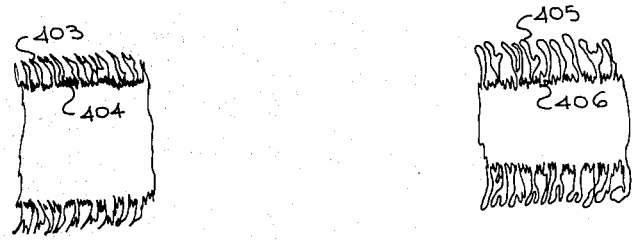

In the accompanying drawings, to be taken as a part of this specification, there are clearly and fully illustrated several preferred embodiments of this invention, in which drawings:

FIG. 1 is a view in elevation of a portion of a shirring machine having the shirring head construction shown in the Blizzard et al. U.S. patents and arranged for application of water to the casing during the shirring operation, FIG. 2 is a view in elevation of a portion of a shirring machine having a shirring head construction embodying certain features of the Matecki patents and arranged for application of water to the casing in the shirring head, FIG. 3 is a view in elevation of a portion of a shirring machine having four shirring wheels and a pair of feed wheels arranged for application of water to the casing during shirring, FIG. 4 is a view in elevation of a shirring machine having shirring wheels and casing feed belts and arranged for application of water to the casing during feeding to the shirring head and simultaneous application of oil to the interior of the casing, FIG. 5 is an isometric view of the shirring wheels used in several of the shirring machines showing a preferred method for application of water to the casing, FIG. 6 is a detail view of the metering rolls used for feeding casing to any of the several shirring machines shown in the previous figures and arranged for application of water to the casing at the metering rolls, FIG. 7 is a view in elevation of a portion of a piece of shirred casing, FIG. 8 is a view in cross section of a portion of shirred casing which has been shirred by a prior art process, and FIG. 9 is a view in cross section of a strand of casing shirred by the process of this invention.

*Summary of the invention*

This invention is based upon our discovery that synthetic sausage casings can be humidified to the critical moisture content required for satisfactory stuffing during the shirring process. We have found that moisture can be added to dry casing reel stock during the shirring operation without damage to the casing and with the production of a shirred product having substantially improved properties. The moisture can be added externally in predetermined metered amounts at the metering rolls or at the feed belts or the shirring belts or shirring wheels, internally, as water, steam, or mist, by introduction through the shirring mandrel, or externally as a fine spray of water applied before the casing reaches the shirring wheels or shirring belts.

When water is applied to casing as it is introduced into a shirring machine, the casing is rapidly humidified, particularly when the water contains a small amount of a detergent or other wetting agent. A wetting agent is generally incorporated in the water in a very minute concentration to facilitate rapid distribution of the water throughout the casing. Any suitable wetting agent can be used provided that it is non-toxic where the casing is to be used for packaging sausages or other food products. Where the casing may be used for non-food applications, the wetting agent does not need to be completely non-toxic. The wetting agent can also be incorporated in the casing to produce more uniform distribution of moisture.

While the casing can be rapidly humidified by external application or internal application of moisture during the shirring process, it is necessary to supply lubricant to the interior of the casing through the hollow shirring mandrel to provide adequate slippage of the casing along the mandrel. Of course, it is contemplated that the discovery of metals or plastics or other suitable materials of construction for the shirring mandrel which would permit slippage of the wet casing in the absence of lubricant would permit the elimination of the internal lubrication of the casing. While it is preferred to supply water to the casing externally by contact with the casing at the metering rolls, the feed belts, or the shirring belts or shirring wheels, it is possible to supply moisture internally in the form of a stream or spray of water introduced through the shirring mandrel or in the form of steam introduced through the mandrel. Oil can also be added with the water externally to reduce wear on the shirring wheels or belts. This process is applicable to the shirring and humidifying of cellulosic casings and fibrous casings as well as other synthetic casings including but not limited to collagen casings, amylose or starch film casings, alginate casings, etc. It has been found that casings which are shirred and humidified in accordance with this improved process have an improved pattern of shirring. The shirred casings have major folds interspersed with minor folds, the major folds being balloon shaped in cross section and overlying the minor folds in a tightly compacted and nested configuration such that the shirred casing can be handled without separation of the folds and can be extended to its full length with substantially no breakage. The balloon-shaped cross section of the major folds is substantial improvement over the tightly creased major fold formation in casings shirred by prior art techniques and contributes to a lower breakage rate for these shirred casings. The difference in shirring pattern is shown more clearly in the cross sectional views shown in FIGS. 8 and 9 of the drawings and in enlarged photographs of casing cross sections which are submitted with this specification.

As pointed out hereinbefore, the present invention is primarily concerned with an improved process of shirring and humidifying casing using various shirring apparatus of the type shown in several prior art patents. In particular, the improvement resides in the application of water during the shirring process and preferably at the feed portion or the shirring portion of the shirring head. Generally, the turret and other parts of an automatic shirring machine or the floating mandrel, in a floating mandrel type machine, are substantially the same as in the prior art and are not shown herein. Accordingly, only the feed arrangement and the shirring head are shown in the several drawings, and only so much of the shirring head is shown as is necessary to illustrate the invention. In most cases, drive belts and similar portions of the apparatus are not shown to provide a clearer view of the mode of application of water during the shirring process.

Referring now to FIG. 1 of the drawings, the improved process of this invention is illustrated as applied to an apparatus of the type shown in the Blizzard et al. patents. In comparing the apparatus of FIG. 1 with the corresponding figure in the Blizzard et al. patent, the same reference numerals are not used for the same parts shown in that patent, but the correspondence of parts and manner of operation will be apparent. In FIG. 1, the reference character 1 is applied generally to an angle iron welded frame which includes a rear bottom longitudinal angle 2, a rear intermediate angle 3, a rear top longitudinal angle 4, and rear upright angles 5. The remaining portions of frame 1 are disclosed in more detail in FIG. 1 of the Korsgaard patent to which reference is made for a more complete understanding of the same.

Frame 1 also includes transversely extending angles 6. Mounted on the rear top angle 4 and on a corresponding angle on the opposite side is plate 7 which carries a measuring roll 8. Measuring roll 8 is rotatably mounted between support plates 9 which also support a rotatable squeeze roll 10. Cooperating with the measuring roll 8 is a metering disk 11 that is arranged to operate a measuring limit switch 12 for stopping further operation of the shirring head when a predetermined length of casing has been shirred.

In the Blizzard et al. and Korsgaard patents, there is explained in greater detail the employment of a tear limit switch for stopping further operation of the shirring head in the event that the casing becomes torn. The tear limit switch is operated by roller 13 which engages the upper side of the casing.

Mounted on the angle iron frame 1 are shirring head side plates 14 which constitute the framework for the shirring head, further details of which will be described hereinafter. Mounted on side plates 14 is a shirring head motor 15 that is suitably controlled for starting, driving, and stopping the shirring head which is generally referred to as 16.

The shirring head 16 is arranged to receive a relatively thin walled synthetic sausage casing 17 from a reel 18 that is rotatably mounted on shaft 19. As the casing 17 comes from the reel 18, it is flat and is sometimes referred to as reel stock. It passes between the measuring roll 8 and the squeeze roll 10 and is then inflated as shown at 20. It will be observed that the squeeze roll 10 can be positioned by handle 21. Immediately below the roller 13 which operates the tear limit switch and on the under side of the inflated casing 20 is a roller 22 which is carried by an arm 23. The roller 23 is employed to limit the downward movement of the roller 13 when the casing is deflated. The casing is drawn over a mandrel (not shown) which has a central longitudinal aperture through which air flows under a slight pressure to inflate the casing to its full diameter and thus facilitate the shirring operation. The central aperture in the shirring mandrel also provides an opening for introduction of oil or other lubricant into the interior of the casing and also for the introduction of water or steam in certain variations of this process.

The inflated casing 20 is directed into the shirring head 16 between guide rollers 24 which are mounted on vertical supports 25 that in turn are mounted on the ends of arms 26 secured to and extending from the plate 7. Using the shirring head 16 constructed as herein disclosed and with appropriate changes in the openings in the shirring dogs or case, it is possible to shirr a wide range of sizes of synthetic sausage casings. The casings with which this invention can be employed range in thickness from .001–.004 in. and in length from about 30–160 ft. While the reel 18 contains an indeterminate length of casing, the casing wound thereon is cut into lengths of the order from 30–160 ft., depending upon the requirements, which lengths, it will be understood, are shirred onto a mandrel by the shirring head 16. The internal diameter of the casing with which this apparatus can be employed ranges from about $16/32$ to about $60/32$ in. While the apparatus is used primarily in the shirring of cellulosic casing, it may be used in the shirring of fibrous casing, amylose or starch film casing, collagen film casing, alginate film casing, etc. The shirring head shown in this figure can be used in conjunction with a turret as described in the Korsgaard patent, or a floating mandrel construction as described in the Dietrich patent or other similar arrangements.

The shirring head 16 includes upper and lower shirring belts 27 which have a plurality of staggered spaced shirring dogs 28. The shirring dogs 28 on the upper belt are offset or staggered with respect to the shirring dogs 28 of the lower belt. The belts are supported on pulleys or wheels 29, 30, 31, and 32. Motor 15 is connected by a drive pulley (not shown) to one of the wheels supporting shirring belt 27 and is operable to drive the belt to shirr the casing 20. The lower shirring belt 27 is driven by a motor and pulley arrangement which is not shown but which can be seen in FIG. 1 of the Blizzard et al. patent. The upper and lower shirring belts are driven in coordination with the shirring dogs 28 arranged to engage and shirr the casing 20 on the shirring mandrel. The shirred casing is eventually severed and compressed on a storage mandrel or on the outer end of the mandrel where a floating construction is used and then discharged to a suitable storage hopper where the shirred strand is removed and placed in a box for shipment.

A water storage tank 33 is supported by plates 34 and secured to shirring head plates 14. The water storage tank 33 has an inlet opening 35 and a bottom outlet opening connected to tubing 36 which is in turn connected to a manifold 37. Manifold 37 is connected to valves 38 and outlet tubes 39 which are arranged to supply water to brushes 40 which are positioned for engagement with shirring belts 27. The water which is placed in storage tank 33 to be supplied to brushes 40 for contact with shirring belts 27 is provided with a suitable wetting agent to cause the water to spread evenly over the shirring belts and to be taken up rapidly and distributed evenly throughout the casing during the shirring process. Any suitable wetting agent can be used, but non-toxic wetting agents are required whenever the casing is to be used for food packaging. Since the shirred casing is mainly used for the packaging of sausages and other meats, a non-toxic wetting agent must generally be used in the water. Wetting agents which are effective for the purpose of this invention when added with the water or when added to the casing include soaps and detergents and surfactants of all types including cationic, anionic, and non-ionic materials. Wetting agents which can be used include all water-soluble wetting agents of the types discussed in Surface Active Agents and Detergents, vol. II, Schwartz, Perry, and Berch, Interscience Publishers, Inc., 1958. Suitable wetting agents include but are not necessarily limited to the following classes:

*Anionic wetting agents and detergents.*—Soaps, e.g. alkali metal stearates, palmitates, laurates, oleates, etc., including branched chain and isomeric forms thereof; sulfuric esters, e.g. sodium lauryl sulfate and other soluble salts of sulfate esters; alkane sulfonates and soluble salts thereof including ether-linked sulfonates; alkyl aryl sulfonates, e.g. sodium dodecyl benzene sulfonate, etc.; mahogany and petroleum sulfonates; soluble salts of phosphonate esters.

*Cationic wetting agents and detergents.*—Non-quaternary nitrogen bases, e.g. fatty nitriles, fatty amines with ether linkages, etc.; and quaternary nitrogen bases.

*Non-ionic wetting agents and detergents.*—Polyoxyethylene derivatives of phenols and polyoxyethylene derivatives of alkyl phenols.

*Ampholytic surfactants.*—Dodecyl-beta-alamine.

*Miscellaneous new types of surfactants, wetting agents and derivatives.*—Organo-silicon detergents, e.g. silylphenoxy alcohols; phosphonate detergents, e.g. sodium salts of fatty phosphonates; fluorinated detergents, e.g. fluorine-containing organic acids and water soluble salts thereof; sulfoxide detergents, e.g. fatty derivatives of disulfoxides; polymeric detergents containing hydrophobic and hydrophilic groups; sulfated and sulfonated polymers; phenolic polymers, e.g. condensation products of a difunctional monoalkylated (ortho or para position) phenol with ethylene oxide; derivatives of polyvinyl pyridine.

Examples of commercial wetting agents, detergents, and surfactants which fall within several of the above noted categories include the following: Myerol—fatty monoglycerides; Atlas G-3300—alkyl aryl sulfonate; Aldo 33—glyceryl monostearate; S-1787—glyceryl monooleate; Glycosperse S-20—polyoxyethylene (20) sorbitan monostearate; Triton X-100—alkyl aryl polyether alcohol; Glycosperse NP-10—polyoxyethylene (10) ether of nonyl phenol; Hyamine 1622—di-isobutyl phenoxy ethoxy ethyl dimethyl benzyl ammonium chloride, monohydrate; Aerosol 18—n-octadecyl disodium sulfosuccinate; Duponol WA—sodium lauryl sulfate. A preferred wetting agent is dioctyl sodium sulfosuccinate which is available under the trade name, Aerosol OT. This wetting agent can be used in concentrations of the order of 0.02% or higher. The wetting agent is preferably used in a concentration of 0.04% which is adequate for the purposes of this invention.

In the operation of the improved process of this invention, the casing 20 is fed through the shirring head and shirred by the apparatus. The casing is accurately metered by rolls 8 and 10 (the drive mechanism for metering roll 8 is not shown) and is inflated before it passes over the shirring mandrel. Water is metered at a predetermined rate by valves 38 to brushes 40 which wets the shirring belts 27 so that the casing is moistened as it is shirred. Oil is supplied through the shirring mandrel to the interior of the casing to cause it to slide easily over the shirring mandrel. The shirred strands of casing are weighed after removal from the shirring apparatus and the amount of water uptake determined. The valves 38 are then adjusted so that the amount of water applied to shirring belts 27 is just sufficient to provide the predetermined critical range of water required in the shirred casing for satisfactory stuffing. In the case of very thin walled sausage casings used for frankfurters and similar small sausages, the moisture content of the casing is in the range of about 14–18%. For thick walled casings and fibrous casings used for packaging of large sausages, the water content may vary from 14–25% or even higher. While this form of the invention shows the water being applied to the shirring belts, it will be obvious from the description of subsequent figures of the drawings that water can be applied through the interior of the shirring mandrel or through the metering roll or by an external spray or other suitable arrangement.

In FIG. 2 of the drawings, our process is applied to a different type of shirring machine. In this shirring machine, shirring wheels are used in place of the shirring belts shown in FIG. 1, and the water used for moistening the casing during shirring is applied to the shirring wheels and to feed-in belts in a manner which will be subsequently described.

In this shirring machine, there is provided a frame which is generally of an angle-iron and plate-welded construction. Frame 101 includes vertically extending angles 102 and 103 and supporting plate 104. At the upper edge of the frame 101 are horizontally extending angles 105 and transversely extending angles 106. On angles 105 there is supported a plate 107 which carries measuring roll 108 and squeeze roll 109. Rolls 108 and 109 are mounted on support rolls 110. Cooperating with measuring roll 108 is a metering disk 111 which cooperates with measuring limit switch 112 for stopping further operation of the shirring head when a predetermined length of casing has been shirred.

The shirring head which is generally designated as 113 is supported by upwardly extending plates 114 and 115 and horizontally extending supporting plates 116 and 117. The shirring head 113 is arranged to receive relatively thin walled synthetic sausage casing 118 from reel 119 which is rotatably mounted on shaft 120. As the casing 118 comes from reel 119, it is flat in the form of reel stock and passes between measuring roll 108 and squeeze roll 109 and then is inflated as shown at 121. Squeeze roll 109 is adjustable by lever 122 for initial threading of casing into the machine. The inflated casing is fed over a shirring mandrel (not shown) and passes between upper and lower rollers 123 and 124. Roller 123 operates a tear limit switch which stops the shirring head in the event that the casing becomes torn, and roller 124 limits the downward movement of roller 123 when the casing is deflated. The casing also passes between guide rollers 125 mounted on upwardly extending arms 126.

The inflated casing 121 next passes between upper and lower feed belts 127 and 128 which cooperate to form a closed circular passage which assists in feeding the casing to the shirring wheels. Feed belt 127 is guided and driven by rollers 129, 130, 131, and 132. Feed belt 128 is driven in coordination with belt 126 by rollers 133, 134, 135, and 136. The drive rollers for the belts 127 and 128 may be driven by motor 137 mounted on plate 116 at the upper end of the shirring head 113 or may be driven by another motor (not shown). In prior uses of this type of shirring machine, the belts 127 and 128 were used for the dual function of feeding inflated casing 121 to the shirring wheels and applying oil or other lubricant to the exterior of the casing.

The inflated casing 121 is fed into a plurality of shirring wheels 138 which are mounted on end plate 115. Shirring wheels 138 are driven by motor 137 or by any other suitable power source. Shirring wheels 138 do not show the details of the shirring teeth construction but can be in the configuration of the shirring wheels shown in the Matecki patents or any other suitable design. The casing 121 is shirred on the mandrel by the wheels 138 and the shirred product removed by the portion of the apparatus to the left of the shirring wheels, which is not shown. A water storage tank 139 is supported by plates 140 and 141 and is secured to shirring head plates 114. The water storage tank 139 has an inlet opening 142 and a bottom outlet opening connected to tubing 143 which is in turn connected to a manifold 144. Manifold 144 is connected to a plurality of valves 145 and outlet tubes 146 which are arranged to supply water to brushes 147 which are positioned for engagement with feed belts 127 and 128 and with shirring wheels 138. The water which is placed in storage tank 139 is preferably provided with a suitable wetting agent to cause the water to spread evenly over the feed belts 127 and 128 and the shirring wheels 138 to reduce loss of water by centrifugal force. The wetting agent also causes the water to spread evenly over the casing and to be taken up and distributed rapidly and evenly throughout the casing during the shirring process.

Any suitable wetting agent can be used, but non-toxic wetting agents are required wherever the casing is to be used for food packaging. Since the shirred casing is mainly used for the packaging of sausages and other meats, a non-toxic wetting agent must generally be used in the water. Wetting agents which are effective include soaps and detergents and surfactants of all types including cationic, anionic, and non-ionic materials. A preferred wetting agent is dioctyl sodium sulfosuccinate which is available under the trade name, Aerosol OT. This wetting agent can be used in concentrations of the order of 0.02% or higher and is preferably used in a concentration of about 0.04%.

In the operation of the improved process of this invention, the casing 118 is inflated by introduction of air through the hollow mandrel, and oil is generally introduced through the mandrel as well to provide lubrication for the casing moving along the mandrel. The inflated casing 121 is fed through the shirring head and shirred by the apparatus. The casing is accurately metered by rolls 108 and 109 (the drive mechanism for metering roll 108 is not shown). Water is metered at a predetermined rate by valves 145 to brushes 147 which wets the feed belts 127 and 128 and shirring wheels 138 so that the casing is moistened as it is shirred. The shirred strands of casing are weighed after removal from the shirring apparatus and the amount of water determined. The valves 145 are then adjusted so that the amount of water applied is just sufficient to provide the predetermined critical range of water required in the shirred casing for satisfactory stuffing. In the case of very thin walled sausage casings used for frankfurters or similar small sausages, the moisture content of the casing is in the range of about 14–18%. For thick walled casings and fibrous casings used for packaging of large sausages, the water content may vary from 14–25% or even higher. While the water is preferably applied to feed belts 127 and 128 and the shirring wheels 138, it is possible to apply water through the interior of the shirring mandrel or to the exterior of the metering roll or by an external spray or other suitable arrangement.

In FIG. 3 of the drawings, there is shown still another form of shirring machine in which the process of the present invention can be performed. The shirring machine shown in FIG. 3 is designed to shirr larger casings than can be handled on the other machines. The shirring machine uses four shirring wheels instead of three wheels or belts as in the other figures and uses feed rollers for transporting the inflated casing to the shirring wheels and for applying water externally to the casing.

In this shirring machine, there is provided a frame which is generally of an angle-iron and plate-welded construction. Frame 201 includes vertically extending supports 202 and horizontal supports 203 and transversely extending supports 204. On upper support 203, there are provided plate members 205, 206, 207, and 208 which form the supporting structure for a shirring head generally designated 209.

Shirring head 209 includes a pair of measuring rolls 210 and 211 which receive and measure casing reel stock 212 fed from reel 213 which is rotatably mounted on shaft 214.

After the casing passes through measuring rolls 210 and 211, it is inflated as shown at 215 by air introduced through the hollow mandrel on which the casing is shirred. The inflated casing passes between rolls 216 and 217 and guides 218 which function as described in the previous figures. The inflated casing passes between feed rolls 219 and 220 which perform essentially the same function as the belts 127 and 128 in FIG. 2. The inflated casing passes into the main portion of the shirring head which consists of four cooperating shirring wheels 221 which are mounted on end plate 207 and driven by motor 222 operating through pulley 223 and speed controller 224. Motor 222 is mounted on a slidable support and can be adjusted in position by rotation of adjustment wheel 225.

A water storage tank 226 is supported above the shirring head. Storage tank 226 has an inlet 227 and a bottom outlet opening connected to tubing 228 which is in turn connected to a manifold 229. Manifold 229 is connected to valves 230 and outlet tubes 231 which are arranged to supply water to brushes 232 for moistening feed rollers 219 and 220 and shirring wheels 221.

The water which is placed in storage tank 226 is preferably provided with a wetting agent to cause the water to spread evenly over the shirring wheels and the feed wheels to prevent loss of water by centrifugal force and to cause the water to be taken up rapidly and distributed evenly throughout the casing during the shirring process. As was mentioned in connection with the other shirring machines, any of a variety of wetting agents can be used although dioctyl sodium sulfosuccinate is preferred in a concentration of about 0.04%.

In the operation of the improved process of this invention using this shirring machine, the casing 212 is fed through the shirring head and shirred by the apparatus. The casing is accurately metered by rolls 210 and 211 and fed by wheels 219 and 220 into shirring wheels 221. Water is metered at a predetermined rate to brushes 232 which wets the wheels 219, 220, and 221 to moisten the casing as it is shirred. Oil is supplied through the shirring mandrel to the interior of the casing to cause it to slide easily over the mandrel. The shirred strands of casing are weighed after removal from the shirring apparatus and the amount of water uptake determined. The valve 230 are then adjusted so that the amount of water applied is just sufficient to provide the predetermined critical range of water required in the shirred casing for satisfactory stuffing. As was mentioned in the description of the other shirring machines, the water can be applied at other points in the process, e.g. through the shirring mandrel or on the metering rolls or by an external or internal spray.

Referring now to FIGS. 4 and 5 of the drawings, there is shown an overall assembly view of one form of shirring machine and a detailed isometric view of the shirring wheels showing the application of water during the shirring process. In FIG. 4, there is shown a shirring machine having a base 301 supporting a reel 302 on a shaft 303 for feeding casing 304 to a shirring head generally designated 305. The supporting base supports a pair of metering rolls 306 and 307 which feed and measure the amount of casing 304 introduced for shirring. The casing 304 which is fed in the form of flat reel stock is inflated as shown at 308 as described for the other shirring machines. The inflated casing 308 is fed between upper and lower feed belts 309 and 310. Feed belt 309 is supported on a plurality of wheels 311, at least one of which is driven by a motor (not shown). Feed belt 310 is supported on a plurality of wheels 312, at least one of which is driven by a motor. Feed belts 309 and 310 direct the inflated casing 308 into shirring wheels 313 which are shown in more detail in FIG. 5. Shirring wheels 313 shirr the casing as shown at 314 on a hollow shirring mandrel 315.

Shirring mandrel 315 is supported by a hollow clamp 316 which is connected for supply of air and oil through tubing 317. Tubing 317 is connected to a T-connector 318 which is connected to an air inlet tube 319 and an oil inlet tube 320 which is in turn connected to an oil reservoir and pump means 321.

Water reservoir and pump means 322 supplies water through a plurality of tubes 323 to brushes 324 which are arranged to moisten the belts 309 and 310 and shirring wheels 313.

At the left end of the apparatus shown in FIG. 4, there is provided a turret construction 325 which includes a receiving mandrel 326 which receives shirred casing upon opening of clamps 316. Mandrel 326 is rotated to a lower position as shown at 327 where the shirred casing is compressed and subsequently doffed into a receiving hopper.

In this shirring apparatus as in the machines previously described, the casing reel stock is fed from the reel through the measuring rolls and inflated. The inflated casing is fed through the feed rolls to the shirring wheels where the casing is shirred and subsequently ejected from the apparatus. The casing is moistened at the feed belts and the shirring wheels. Sufficient water is added to the casing to bring the moisture content to a value of about 14–18% for small sausage casings and to about 14–25% or higher for large thick walled casings. As in the other types of shirring machines, the shirred casing strands are weighed after ejection from the machine and the amount of water uptake determined. The rate of water flow is then adjusted to provide the desired amount of water in the finished strands. In this apparatus as in the other types of shirring machines, the water is utilized to an extent of 90% or more in moistening the casing. That is, less than 10% of the water supplied is lost by being thrown or sloughed off from the belts or wheels. In the machines which have feed belt shirring wheels, the major portion of the water supplied for moistening the casing is supplied to the feed belt, and a minor portion is usually supplied to the shirring wheels. This distribution of water flow to the belts and the wheels is not critical but is for the purpose of preventing excessive loss of water which would occur if a larger portion of water were applied to the shirring wheels where it might be thrown off by centrifugal force.

In the operation of this machine, water is applied to the exterior of the casing at the introduction of the casing to the shirring head. Air and oil are applied through the mandrel 315 to the interior of the casing to inflate the casing and provide lubricant to cause the casing to slip smoothly along the shirring mandrel. If desired, water can be introduced through the shirring mandrel, as was previously described, to moisten the interior of the casing. In such a case, however, it is still necessary to lubricate the mandrel to cause the casing to slide more easily. In some cases, the mandrel may be made of a smooth plastic such as tetrafluoroethylene or acetal resins which have a very low coefficient of friction and will permit easy sliding of the casing even in the absence of a lubricant. If such a mandrel is used, then the interior lubrication can be reduced or completely eliminated. Where metal mandrels, e.g. stainless steel and the like, are used, internal lubrication of the casing is necessary.

In FIG. 6, there is shown a detail view of the metering roll arrangement of FIG. 2 (which is the same as that used in FIG. 1) showing an arrangement for feeding water to the metering rolls for moistening the casing just prior to inflation with air. The several parts of this structure are numbered as in FIG. 2 and perform the same functions. In this modification, the tubes 146 carrying water for moistening the casing are arranged to supply water to brushes 147 which moisten rolls 108 and 109 to supply a predetermined amount of water to the casing. The application of water at the rolls 108 or 109 can be used as a complete or partial substitution for the application of water at the shirring wheels, shirring belts, or feed belts or wheels.

In each of the several forms of shirring machines, the thin walled casing is shirred as shown in FIGS. 7, 8, or 9. In FIG. 7, the casing is shown in an inflated form as at 401 and in a shirred form as shown at 402. In the several forms of shirring apparatus shown herein, it has previously been an accepted procedure to supply oil or other lubricant to the exterior of the casing at the shirring wheels and feed belts or feed rolls as well as to the interior of the casing through the hollow mandrel. When casings have been shirred in this manner and subsequently compressed, the shirred product has had a configuration of the type shown in FIG. 8 with tightly creased major pleats 403 encompassing a plurality of intermediate minor pleats or folds 404. This type of product is shown in more detail in the enlarged photograph submitted with the specification entitled, "Oil Shirred." The tightly creased major pleats or folds which are produced in this type of shirring often are focal points for cracking or breakage of the casing during stuffing. When the casing is shirred by application of water during the shirring process as described in connection with each of the several shirring machines and particularly where water is applied to the casing on the exterior while oil or other lubricant is supplied to the interior of the casing, the casing is shirred in a manner which gives a novel shirring pattern. The casing has a configuration as shown in FIG. 9 and includes major folds 405 interspersed with a large number of minor folds 406. A major proportion of the major folds are ballooned and rounded in cross section and overlie the minor folds in tightly compacted and nested configuration. The casing which is shirred and compressed in this manner is tightly compacted and capable of handling without separation of folds and of being extended to its full length. The rounded balloon shaped cross section of the major folds eliminates a focal point for breakage of the casing and has reduced the incidents of breakage during stuffing. The major and minor folds in the shirred casing as shown in FIG. 9 are angularly displaced in a longitudinal helical pattern as a result of the progressively offset lug or tooth construction in the shirring wheels or shirring belts. This type of product is shown in more detail in the enlarged photograph submitted with the specification entitled, "Water Shirred."

In evaluating this invention, a large number of experiments were carried out in which different sizes, lengths, and gauges of synthetic sausage casings were shirred and humidified as heretofore described. This process has been used in the shirring of thin walled small size sausage casings of the type used for frankfurters and other small sausages and for heavy gauge large size cellulose casings and fibrous casings used in the packaging of large sausages. The performance of these casings was compared with casings which had been humidified to substantially the same moisture content using the prior art technique of circulating moist air over shirred casing strands contained in a perforated carton. In evaluating this humidification and shirring technique, it was necessary to determine its effectiveness on hundreds of strands of sausage casings to determine whether or not it would be satisfactory for commercial use. This was particularly true in the case of the thin walled small size sausage casings. It is, therefore, impractical to set forth either by specific example or in a tabulated form the results obtained on the application of this humidification and shirring technique to any statistically significant number of shirred casing strands. A number of regenerated cellulose casings of the type used for production of frankfurters and other small sausages were shirred and humidified in accordance with this invention. The casings ranged in diameter from 22.50–49.50 mm. and varied in thickness from about 0.9–1.5 mils. Casings ranging from 55–160 ft. in length were shirred and humidified using the apparatus described in the several figures of the drawings. These casings had an initial moisture content of about 7–9% and were humidified to a moisture content of about 16–18% by application of water during shirring. Several experiments were also carried out in which fibrous casing having an initial water content of about 7–9% was humidified to a moisture content of about 25%. Fibrous casing was humidified and shirred in this manner and was highly satisfactory for the preparation of large size sausages. The frankfurter sausage casings which were shirred and humidified in this manner had a breakage of less than 0.5% which is equal to or lower than the breakage of casings of the same size which were shirred dry and then humidified to the same moisture content using the moist air humidification of the prior art.

One of the principal advantages which has resulted from this invention is a more uniform humidification of shirred casings along the entire length and along the major and minor pleat structure. Casings which have been humidified to a moisture content of 17–18% using the prior art moist air humidification technique often vary as much as 3–5% in moisture content between the major and minor pleats and vary even more in moisture content along the length of the shirred casing strand. For example, a 160-ft. shirred casing (29 in. shirred length) was humidified to an average moisture content of 18% using the prior art moist air humidification technique. The moisture content of the casing was found to vary from 20–21% at the extreme ends to 12% at the center of the strand. The moisture will distribute evenly within the casing strand upon extended storage, but substantial differences in moisture content between the ends and middle of the strand have been found after storage periods of 60–90 days and longer. A 160-ft. shirred strand (29 in. shirred length) was humidified to a 17–18% moisture content using the procedure of this invention as described above, and the moisture content had no measurable variation along the length of the casing and between the major or minor pleats or the inside or outside of the shirred strand.

While this invention is particularly applicable to the shirring and humidifying of sausage casings of cellulose of the type used for the preparation of frankfurters, the process is obviously applicable to the shirring and humidification of a wide range of casings. The process is primarily useful for thin walled regenerated cellulose casings but can be used for sausage casings of thicker wall construction of the type used for processing large sausages, e.g. bolognas, etc., and may be used for fibrous casings or casings of a non-cellulosic type, e.g. alginate, amylose, starch, collagen, etc.

While the invention has been described with special emphasis upon certain preferred embodiments and certain preferred processing conditions, it will be obvious that variations in process technique can be made without departing from the inventive concept. It will, therefore, be obvious to any person skilled in the art that within the scope of the appended claims this invention can be practiced otherwise than as specifically described herein.

What is claimed is:

1. In the shirring of synthetic sausage casings wherein dry casing is fed from a storage reel, inflated, and shirred mechanically, the improvement in moistening the casing uniformly which comprises feeding water into contact with the casing subsequent to removal from the storage reel and prior to removal from the shirring process at a predetermined rate sufficient to produce shirred casing having a predetermined higher moisture content.

2. A method according to claim 1 in which the casing is regenerated cellulose or regenerated cellulose reinforced with fibrous paper, having a moisture content of about 8–10%, and is contacted with water at a rate sufficient to produce shirred casing strands having a moisture content of about 14–25%.

3. A method according to claim 1 in which the casing is contacted with water on the exterior or interior surface thereof.

4. A method according to claim 1 in which a lubricant is applied to the casing.

5. A method according to claim 1 in which the casing is contacted with liquid water or with steam.

6. A method according to claim 1 in which the casing is contacted with a small amount of a nontoxic wetting agent sufficient to effect rapid distribution of water throughout the casing.

7. A method according to claim 1 in which the water is applied during the feeding of the casing from the storage reel.

8. A method according to claim 1 in which the water is applied to the casing externally during the shirring of the casing.

9. A method according to claim 1 in which the water is applied to the casing during the feeding from the storage reel and during the shirring of the casing.

10. A method according to claim 9 in which the casing is contacted with a small amount of a nontoxic wetting agent sufficient to effect rapid distribution of water throughout the casing.

References Cited by the Examiner

UNITED STATES PATENTS

| | | |
|---|---|---|
| 1,302,194 | 4/1919 | Mayer. |
| 1,492,697 | 5/1924 | Neuberth _____ 17—42 X |
| 1,938,070 | 12/1933 | Friedler. |
| 2,723,201 | 11/1955 | Blizzard et al. _____ 99—176 |
| 2,983,949 | 5/1961 | Matecki _____ 17—42 |
| 3,049,749 | 8/1962 | Mayer et al. _____ 17—42 X |
| 3,097,393 | 7/1963 | Matecki. |
| 3,158,488 | 11/1964 | Firth _____ 99—176 X |

A. LOUIS MONACELL, *Primary Examiner.*

HYMAN LORD, *Examiner.*